Nov. 7, 1950   M. GARBELL   2,528,647
COMPUTING MACHINE
Filed May 15, 1945   12 Sheets-Sheet 1
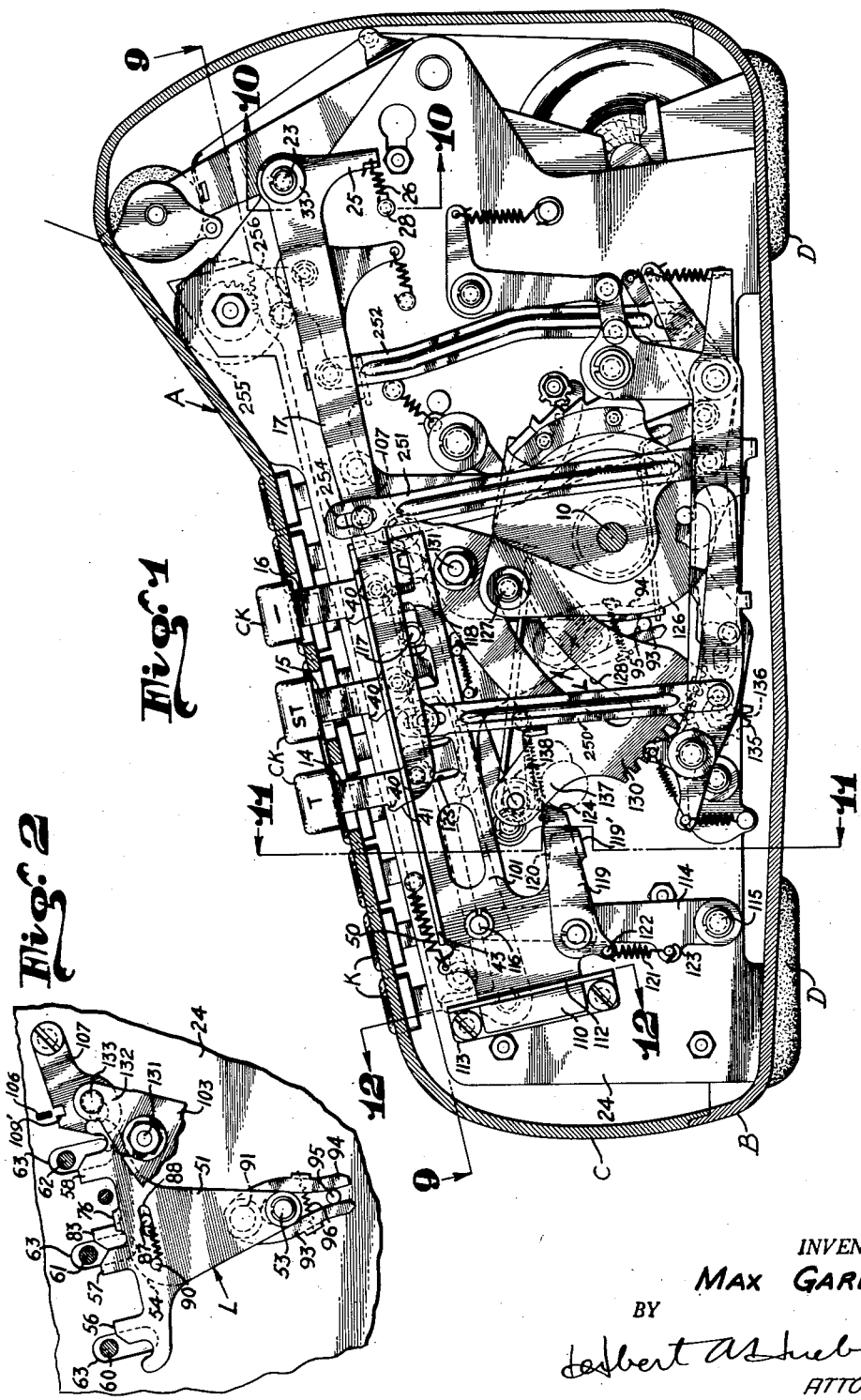
INVENTOR.
MAX GARBELL.
BY
Herbert A. Huebner
ATTORNEY

INVENTOR.
MAX GARBELL.
ATTORNEY

INVENTOR.
MAX GARBELL.
BY
ATTORNEY

Nov. 7, 1950   M. GARBELL   2,528,647
COMPUTING MACHINE
Filed May 15, 1945   12 Sheets-Sheet 4

INVENTOR.
MAX GARBELL.
BY
*Leibert A. Huebner*
ATTORNEY

Nov. 7, 1950 — M. GARBELL — 2,528,647
COMPUTING MACHINE
Filed May 15, 1945 — 12 Sheets-Sheet 5

INVENTOR.
Max Garbell.
BY
ATTORNEY.

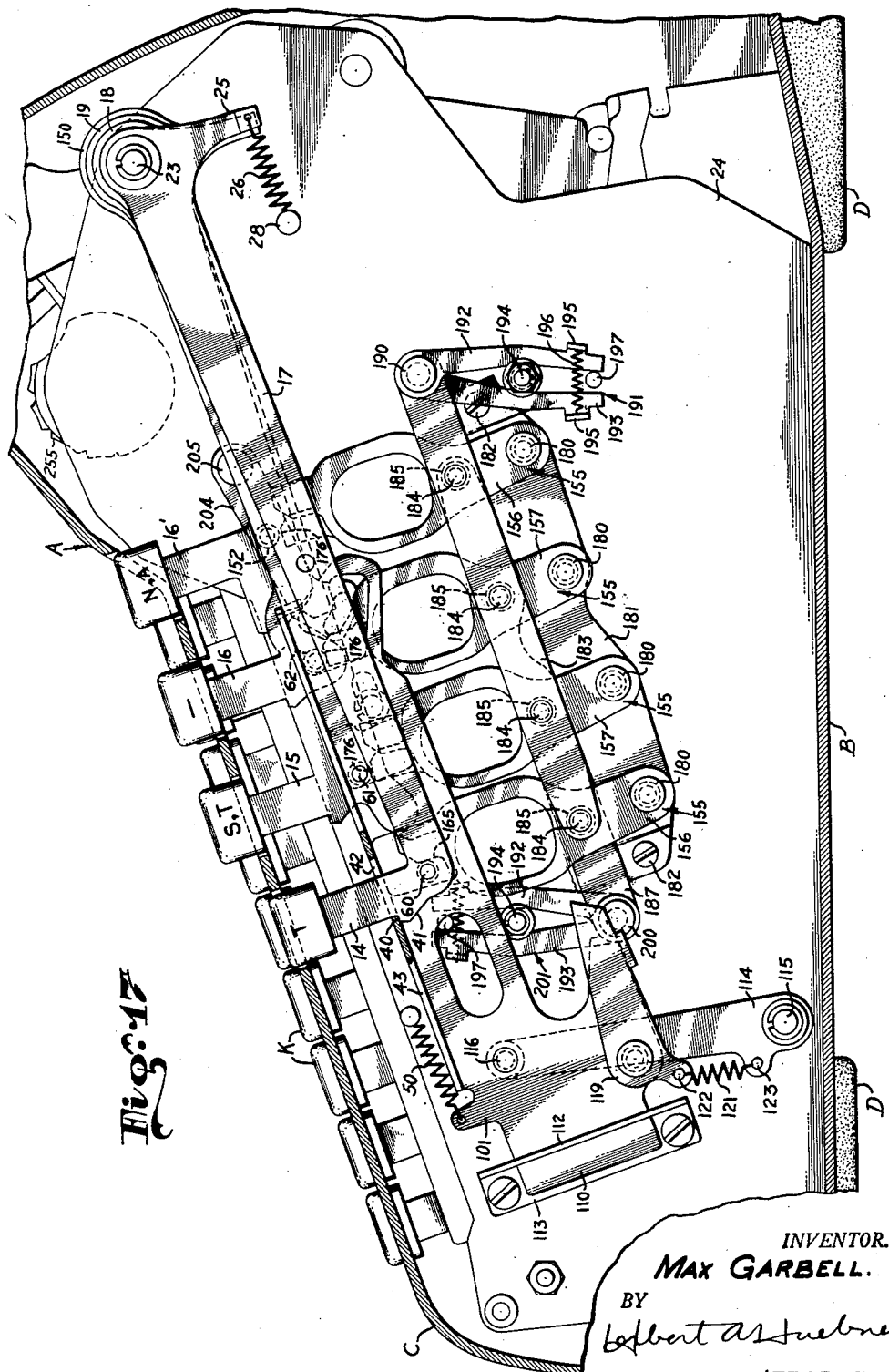

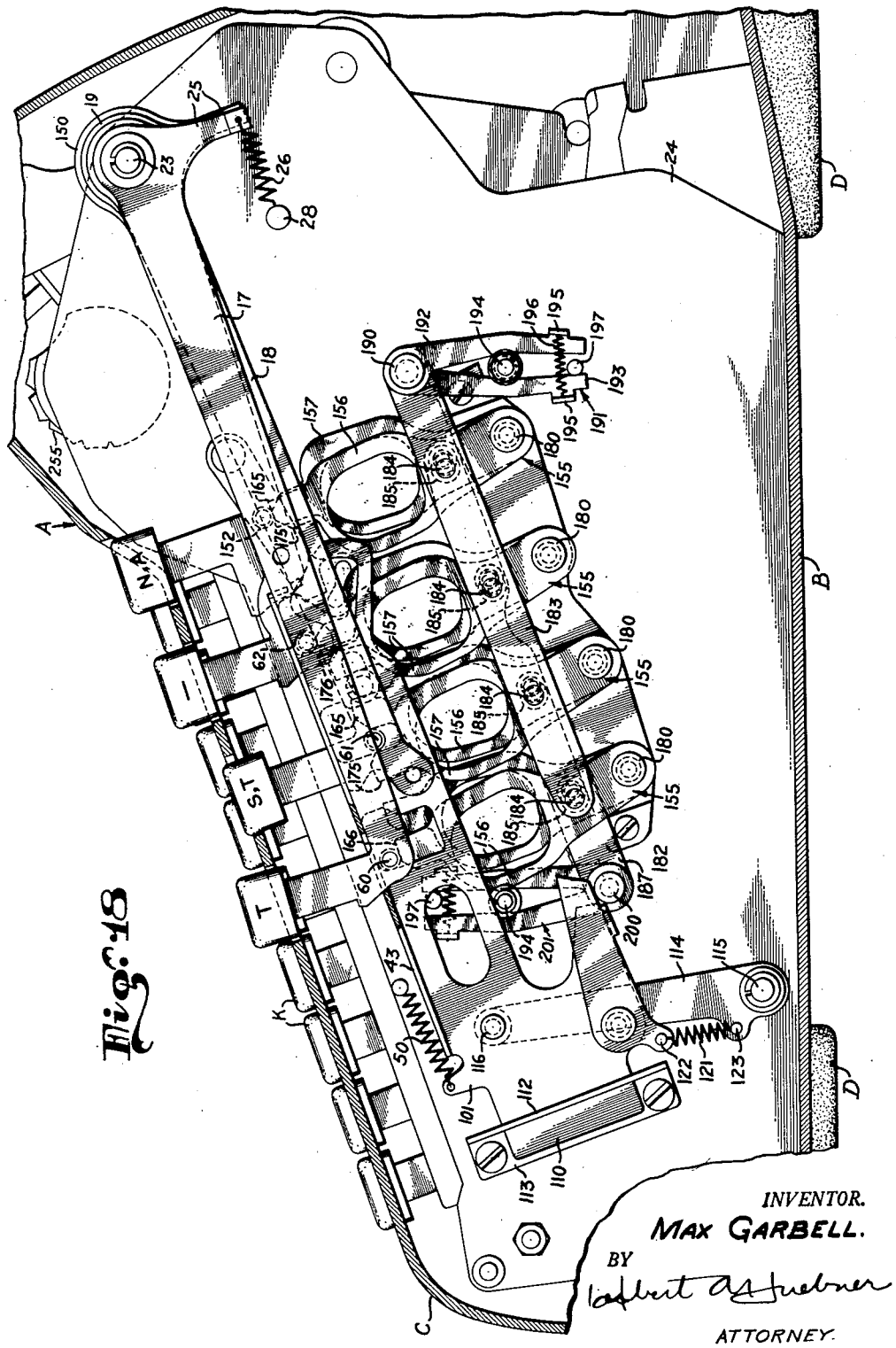

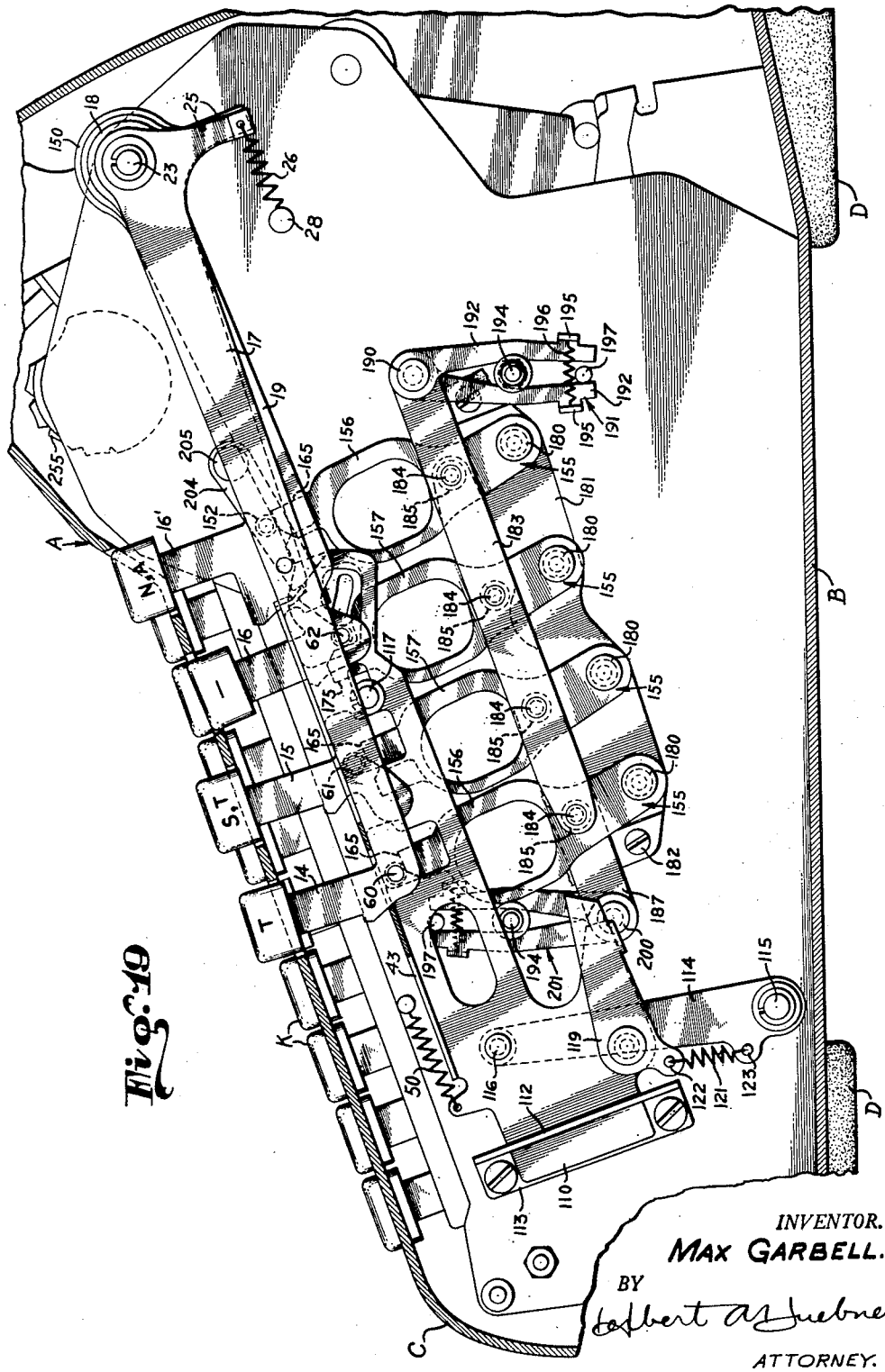

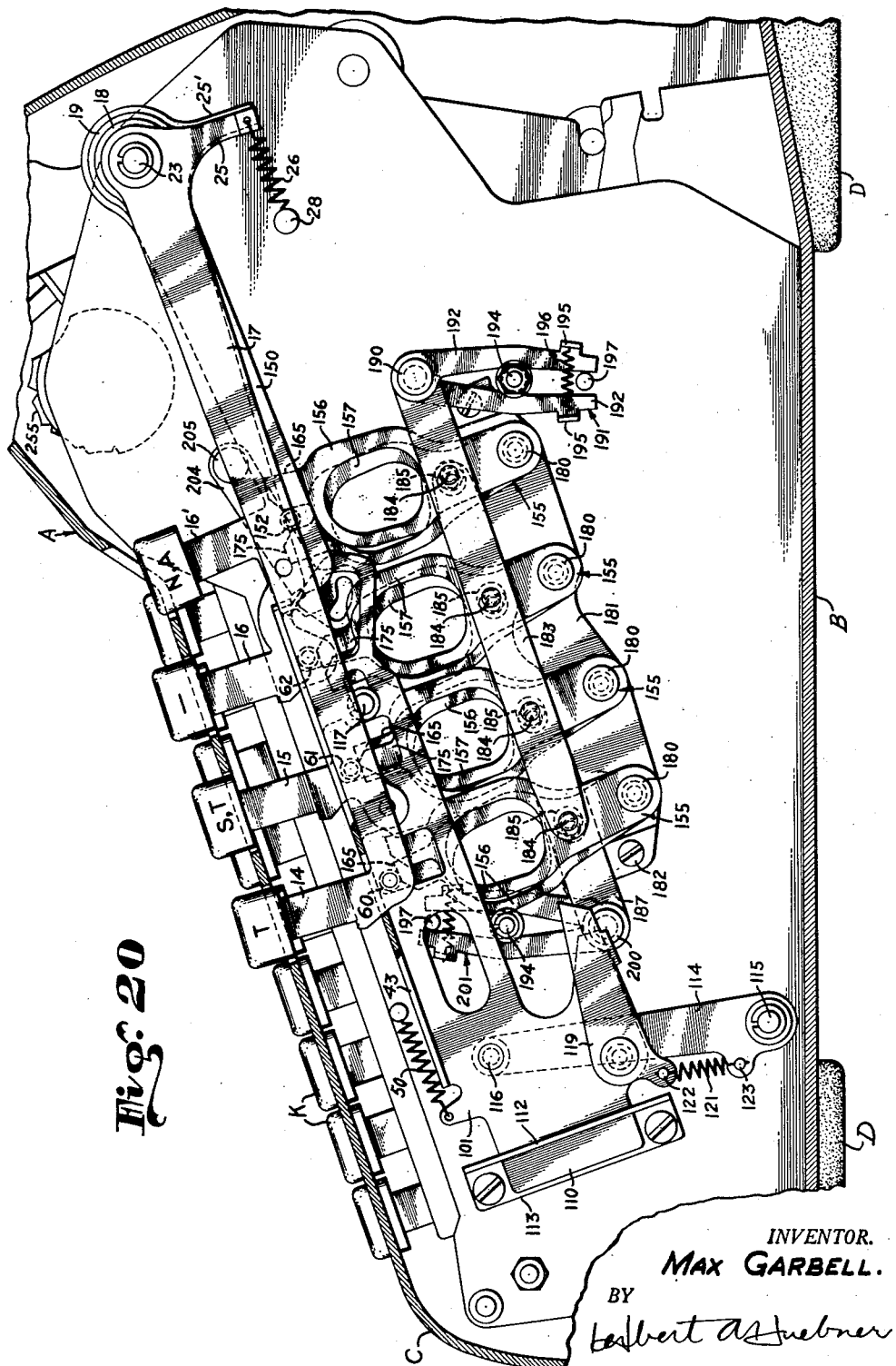

Nov. 7, 1950 — M. GARBELL — 2,528,647
COMPUTING MACHINE
Filed May 15, 1945 — 12 Sheets-Sheet 10
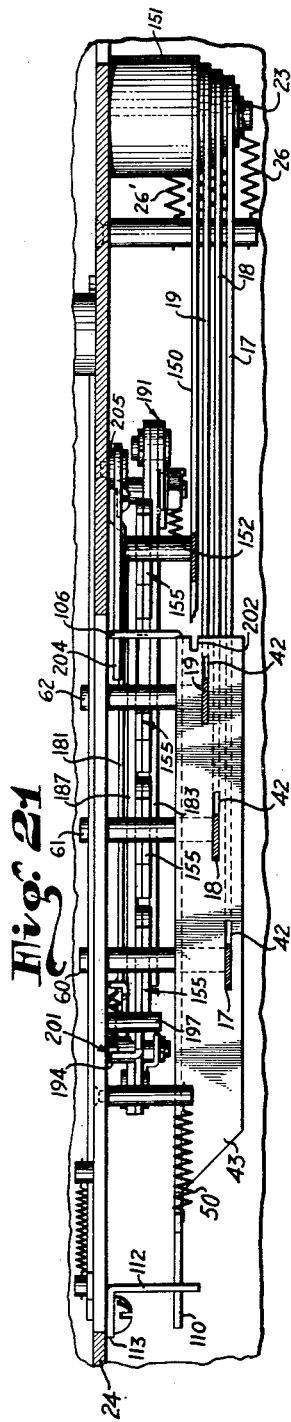
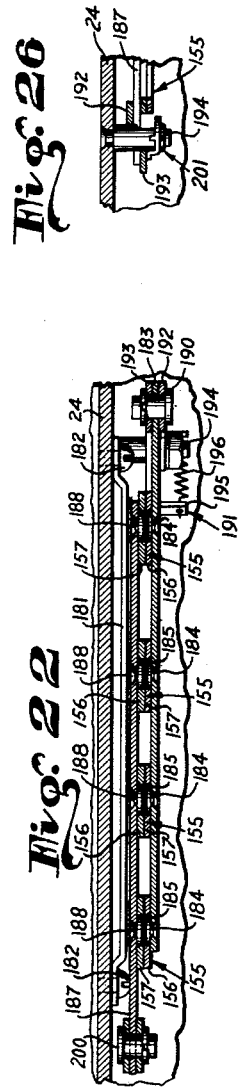
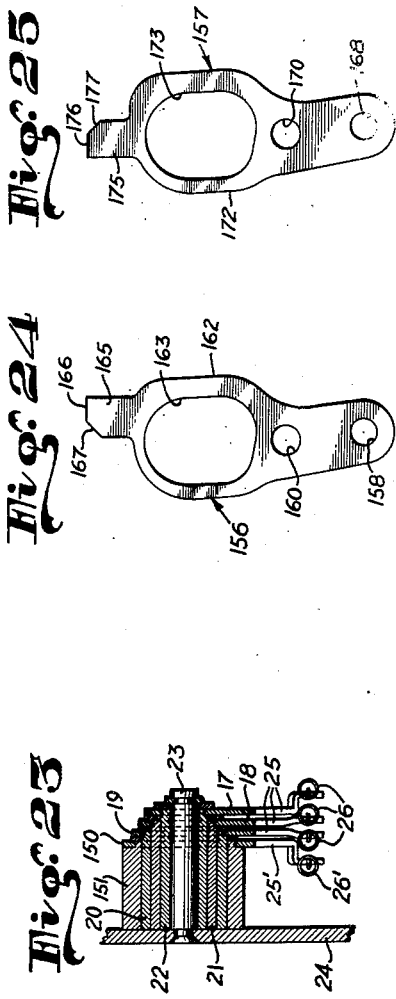
INVENTOR.
Max Garbell.
BY
ATTORNEY.

Nov. 7, 1950　　　　　M. GARBELL　　　　　2,528,647
COMPUTING MACHINE

Filed May 15, 1945　　　　　　　　　　　　12 Sheets-Sheet 11

INVENTOR.
MAX GARBELL.
BY
ATTORNEY.

Nov. 7, 1950 — M. GARBELL — 2,528,647
COMPUTING MACHINE
Filed May 15, 1945 — 12 Sheets-Sheet 12

INVENTOR.
MAX GARBELL.
BY
Herbert A. Huebner
ATTORNEY.

Patented Nov. 7, 1950

2,528,647

UNITED STATES PATENT OFFICE 2,528,647

COMPUTING MACHINE

Max Garbell, Los Angeles, Calif., assignor to Royal Typewriter Company, Inc., New York, N. Y., a corporation of New York Application May 15, 1945, Serial No. 593,845

3 Claims. (Cl. 235—130)

The present invention relates generally to machines such as computing machines which make use of feature key controlled means wherein the manual operation of a key determines or controls the character of the computing or other operation that will be next performed by the machine with which the operated key is associated. The invention relates more particularly to means made effective by operation of any one of a plurality of feature control keys of a computing machine, for example, to lock all of its other control keys against being operated, inadvertently or otherwise, until the operation controlled, i. e. determined by the last previously operated control key, has been completed.

The undesirable consequences that ordinarily result from the depression of a feature control key of either a manually or motor driven computing machine before a computing operation controlled by a previously depressed control key has been completed is well understood by those skilled in the art. A large per cent of computing machines today are motor driven and there are definite indications that this percentage will increase in the future. The depression of a second feature control key of a motor driven computing machine while a computing operation is then in progress will often cause extensive damage to such a machine.

An object of my present invention is to provide automatic, improved, and less expensive means which will positively prevent the operation of any one of a plurality of feature control keys of a computing or other key controlled machine before a key controlled operation thereof then in progress has been completed.

Another object of my invention is the provision in a computing machine of feature control key locking devices which are operable automatically upon a small initial depression of any one of a plurality of feature control keys to lock all of the other of such keys against depression before the operation of the computing mechanism under control of the operated key starts.

Another object of my present invention is the provision in a computing or other machine employing a plurality of depressible feature control keys of means which will prevent the simultaneous operative depression of more than one of such keys at the same time, i. e. instant.

Another object of my present invention is the provision in a computing machine employing several feature control keys of two cooperating but separate and separately operable automatic means for locking temporarily against operation all of the remaining feature control keys after any one of such keys has been operated.

Another object of my invention is to provide for use in feature key controlled computing machines having computing mechanism operable manually or by motor power a first locking means made effective immediately by an initial depression of any feature control key to lock all of the other of several unoperated feature keys against operation, and a second locking means made effective subsequently by a small initial movement of the computing mechanism to lock all of the unoperated feature control keys against depression on the first locking means so as to relieve some of the strain.

Another object of my invention is the provision of locking means for depressible feature control keys of a computing or other machine which means can be constructed to be applied to such a machine having a large number of control keys for locking all of the unoperated keys against depression upon a small initial movement of any one of such control keys.

It is one feature of my present invention to have two separate but cooperative key locking devices which become effective upon unoperated keys after a quite small initial operative movement of the operated key and of the main driving shaft of the machine.

It is another feature of my invention to so construct the movable parts of one of the key locking devices that these parts can be pre-assembled as a compact unit and so mounted on fixed cooperative elements of the machine.

Another feature of my present invention is the provision for application to a machine having a plurality of depressible control keys of key locking means having a set of two locking members for each control key, each set being interconnected with all of the other sets by links which can be changed in length to secure cooperative key locking action of a large number of such locking members. Still another feature resides in the provision of a spring powered, normalizing, (i. e. restoring to normal starting positions) means interconnected with corresponding locking members of each set so that two such means can restore all of any number, in reason, of key locking sets to normal inoperative positions. And another feature resides in an arrangement of the normalizing means whereby they also serve as power equalizing means which determine that an equal amount of depressive force on each control key locks the unoperated control keys against depression.

Other objects, features, and advantages of my present invention will appear as the description proceeds.

I have illustrated in the drawings embodiments of the present invention adapted for application to computing machine structure of the kind disclosed and claimed in my copending application, Serial No. 566,595, filed December 4, 1944, but it is to be understood that my present invention can be applied to and incorporated in other types of key controlled computing machines and is not limited for use with only such a computing machine structure as is shown and described in my above noted copending application.

Referring to the drawings which form a part of the specification:

Figure 1 shows a right hand side view of the computing machine parts which comprise a feature control key locking means and other cooperating parts associated therewith, the right hand side wall of the case and certain other parts being shown broken away in whole or in part.

Figure 2 shows a side elevational view of the feature key locking means of Figure 1, broken away in part, as the means appear when the machine is in normal adding condition.

Figure 16:
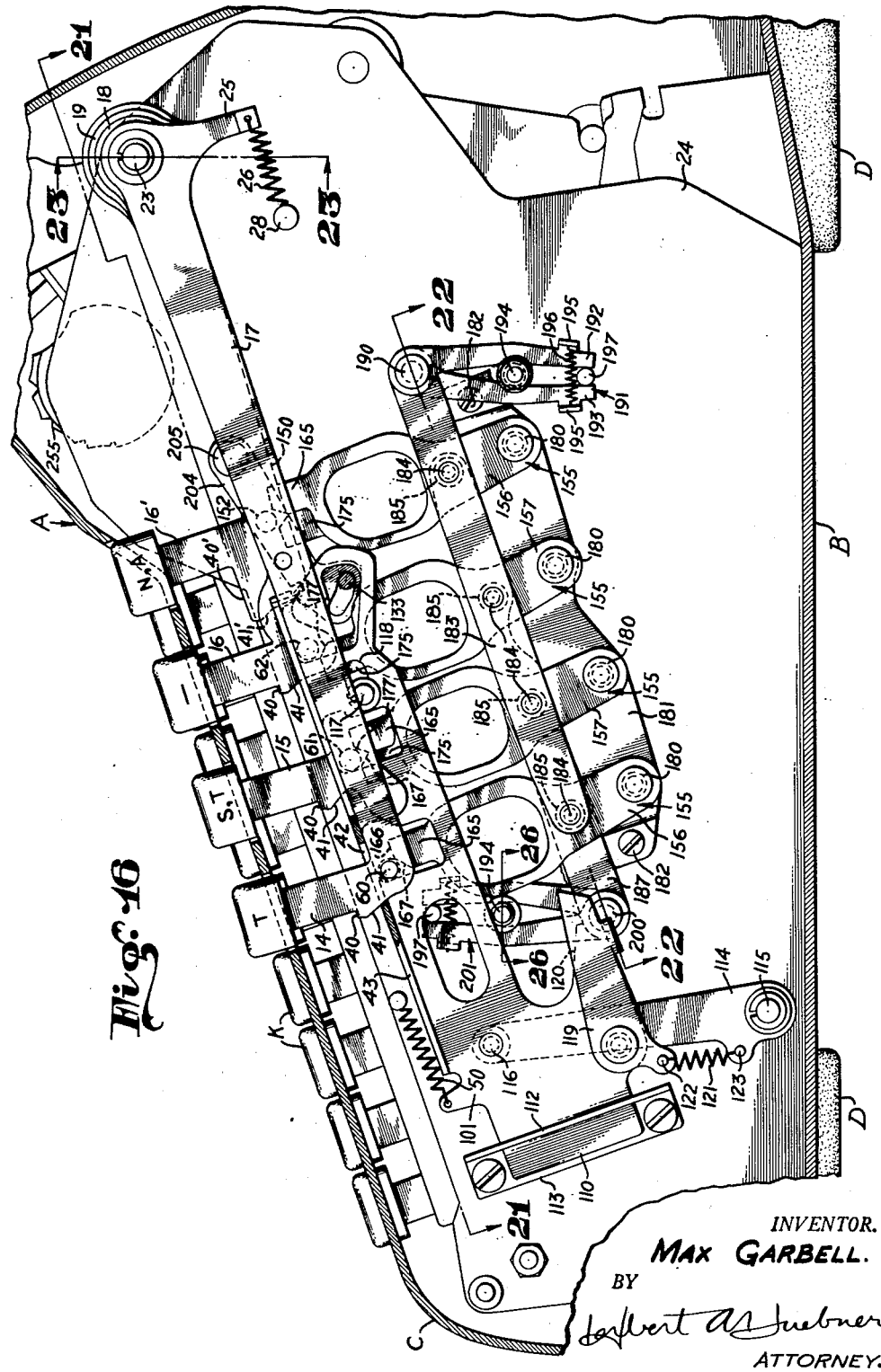

Figure 16 is a side view broken away in part, of the computing machine which illustrates another form of feature control key locking means constructed according to my invention, that is capable of locking a large number of manually depressible control keys of a machine against operation upon initial operative movement of any one of that number. In this view all keys are shown in normal unoperated positions.

Figure 17 is a view similar to Figure 16 and shows the locking means with the totalizer key depressed, and the remainder of the control keys locked against depression.

Figure 18 is a view similar to Figure 16 and shows the sub-total key depressed and the other keys locked.

Figure 19 is a view similar to Figure 16 and shows the subtraction key depressed and the other keys locked.

Figure 20 is a view similar to Figure 16 and shows the non-adding key depressed and the other keys locked.

Figure 21 is a partial sectional view of the locking means and other structure of Figure 16 taken along the line 21—21 of Figure 16.

Figure 22 is a partial sectional view of the structure of Figure 16 taken along the line 22—22 of Figure 16.

Figure 23 is a sectional view of a portion of the structure of Figure 26 taken along the line 23—23 of Figure 16.

Figure 24 is a side view of a lock member which forms an element of the key locking means of Figure 16.

Figure 25 is a view similar to Figure 24 and shows a lock member which is a companion member to that of Figure 25 and forms therewith a locking set to be disposed under each control key.

Figure 26 is a partial sectional view of the structure of Figure 16 along the line 26—26 as indicated.

Figure 27:
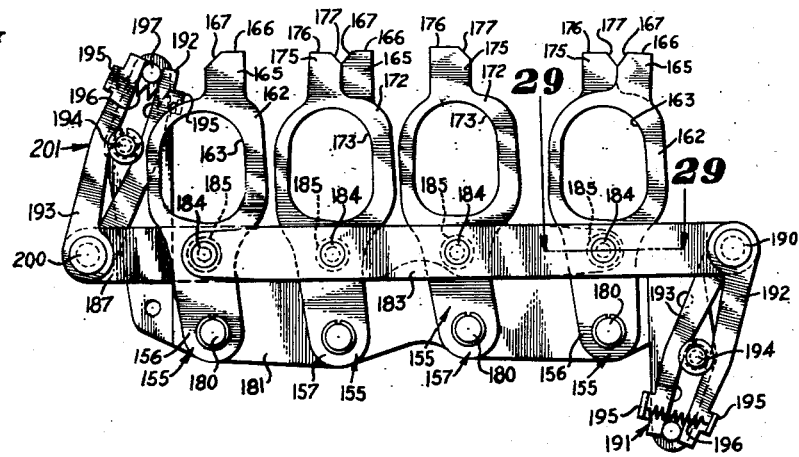

Figure 27 is a right hand side view of the locking means of Figure 16, assembled as a separate unit on a mounting plate detachably fastened on the machine and shown with portions broken away in Figure 16.

Figure 28:
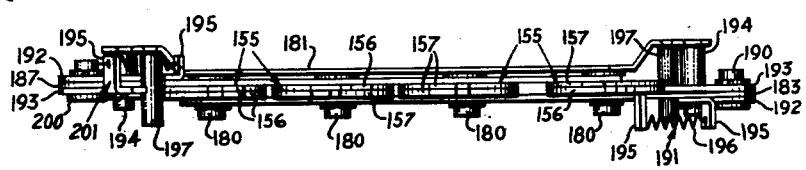

Figure 28 is a top view of the structure of Figure 27.

Figure 29:
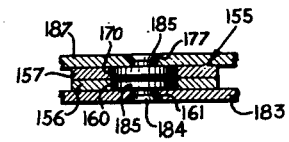

Figure 29 is an enlarged cross-section along the line 29—29 of Figure 27, as indicated.

Figure 30:
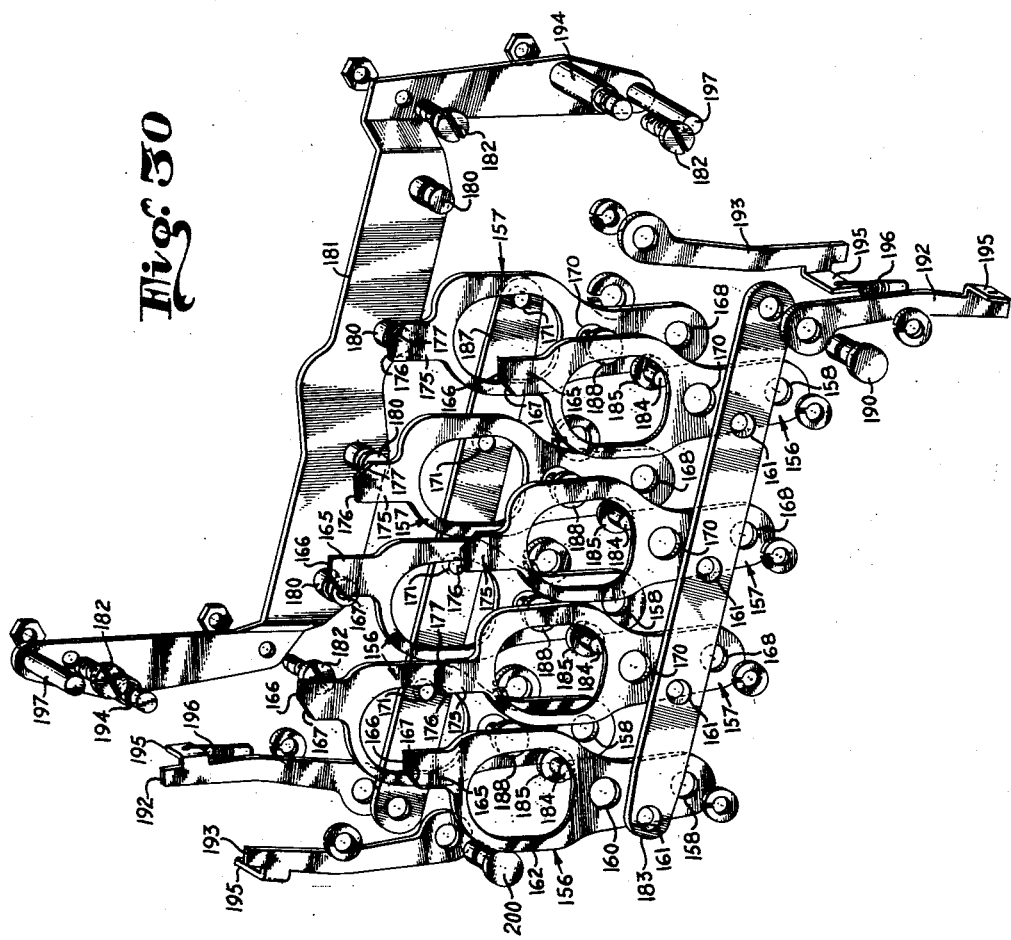

Figure 30 is an exploded perspective view of the locking means of Figure 27.

My present invention is first described as being carried out in connection with only three feature control keys such as are widely employed in computing machines. Further on in the description, it will be clearly disclosed how my invention, when desired, can be applied to computing or other machines having a much larger number of feature control keys than three.

In carrying out the present invention, a housing A for the adding machine may have a base portion B, a cover portion C and feet D of suitable shape, size and construction such as is illustrated in the drawings.

Numeral keys K projecting above the top of the cover C may be of the same construction and arrangement as is disclosed and claimed in my copending application Serial No. 566,595 or of any other suitable construction and arrangement.

Feature control keys

For determining that a desired kind of computation is performed in connection with depressions of selected keys K, I provide means which are controlled by the depression of a certain one of a plurality of feature control keys generally designated as "CK." Depression of the key nearest the front of the machine preferably designated "T" by such a mark on the top thereof, determines that a totalizing operation will be performed. Depression of the next key designated "ST" determines that a sub-total of a plurality of items will be provided by the machine. Depression of a third key shown (preferably farthest from the front of the machine) designated "—" determines that a subtraction operation will be performed. As will be pointed out hereinafter with more particularity, more than the three feature control keys CK illustrated may be used with my computing machine. Each of these computing operations determined by the depression of a selected control key CK is performed by an operative movement of a rock shaft 10 which may be oscillated by manual operation in a well known way of a pull crank 11 or by an electric motor (not shown) which may be drivingly connected to the shaft 10 and key controlled by means (not illustrated) which may be of a well known construction or as is disclosed and claimed in my copending application, Serial No. 566,595, filed December 4, 1944.

As will be well understood by those skilled in the art, it is desirable to render it impossible to depress any one of the feature control keys CK while my computing machine is then performing an operation previously initiated and controlled by the depression of any of the other control keys. To this end, the keys T, ST, and — are mounted on stems 14, 15, and 16 respectively, the upper ends of which project through appropriate holes in the top of the cover C. The lower ends of the stems 14, 15, and 16 may be integrally joined to rearwardly extending levers 17, 18, and 19, respectively. To secure a compact pivotal mounting for these levers having no appreciable side sway or wobble the rear end of lever 19 is preferably securely fastened in a well known way to a sleeve member 20 which telescopes over with a snug working fit a sleeve member 21 to which the lever 18 is securely fastened. The sleeve member 21 in like manner telescopes over a sleeve member 22 to which the lever 17 is securely fastened. The sleeve member 22 has a snug working fit on a shoulder stud 23 which is firmly fastened in a wall element 24 of a frame which may be of the same construction and arrangement as wall element 33 of the computing machine structure of my above mentioned copending application Serial No. 566,595.

An integral depending arm 25 on the end of the lever 17 has one end of a pull spring 26 fastened to an outwardly bent end portion thereof, the other end of the spring being fastened to a stud 28 in the wall 24 for swinging the lever 17 and key T up to normal position after they have been manually depressed, latched, and subsequently released. The levers 18 and 19 may each have a spring powered return means of similar construction to the means described for the lever 17. However, the bent end portion of the depending arm 25 of lever 19 will extend inwardly, and the spring for attachment to a depending arm on lever 18 will be attached directly to the arm. One end of each of these return springs will be fastened to a stud 28. The levers 17, 18 and 19 may be separated by thin washers 32 and a suitable washer 33 bearing against the outer face of lever 17 may be securely fastened on the end of stud 23 in a well known way.

*First feature control key locking means*

Figure 3:
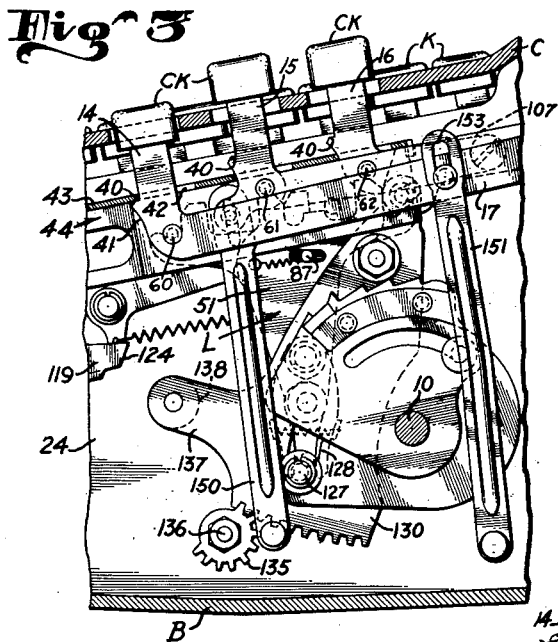
Figure 3 shows a side view, broken away in part, of the feature key locking means of Figure 2 and certain associated mechanism with the totalizer key in depressed operative position, latched therein with the sub-total and substraction keys locked against being accidentally depressed.
Figure 5:
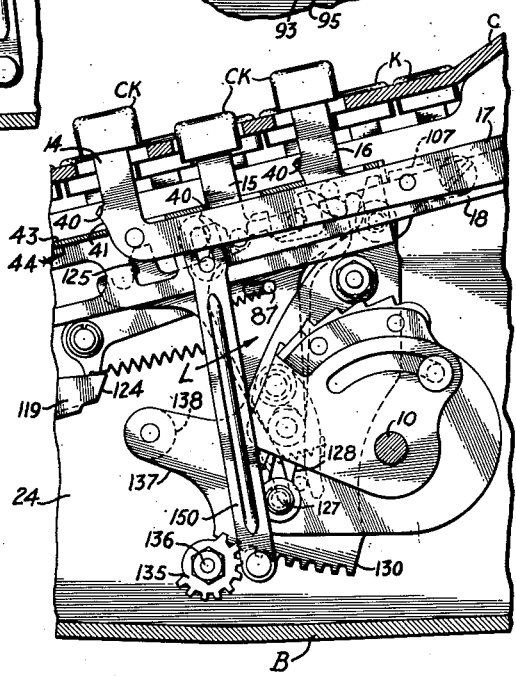
Figure 5 is an operational view similar to Figure 3 in which the sub-total key is in depressed operative position, latched therein with the totalizer and subtraction keys locked against accidental operation.
Figure 7:
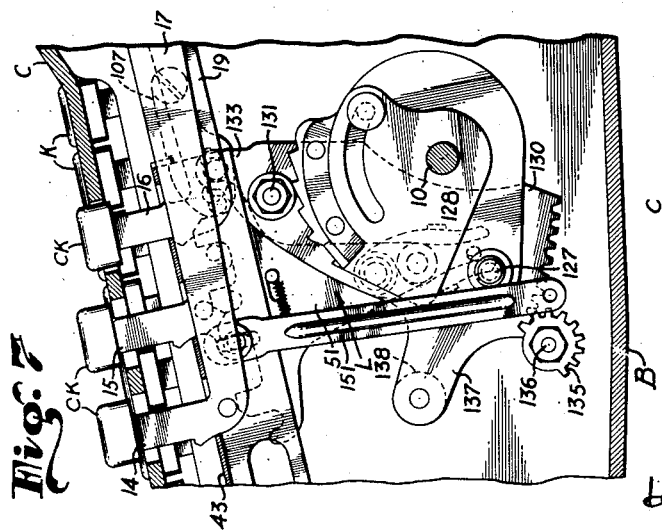
Figure 7 is an operational view similar to Figure 3 in which the subtraction key is in depressed operative position latched therein with the totalizer and sub-total keys locked against accidental operation.

For latching a manually depressible feature control key in its depressed position, (see Figures 1, 3, 5, and 7) a shoulder latch element 40 may be provided on each of the stems 14, 15, and 16 shaped substantially as illustrated in Figures 3, 5 and 7. A cam formation 41 on each element 40 engages the forward edge of an associated slot 42 made in an outwardly bent flange element 43 of a latch plate 44 slidably mounted in a way presently to appear.

Depression of any feature control key moves the plate 44 forwardly against the yielding action of a pull spring 50 having one end fastened to the plate and the other end to a pin in the wall 24. When a square formation on a shoulder element 40 is moved below the flange 43, the spring 50 moves the latch plate 44 rearwardly and latches the depressed key positively in its operative or down position.

Figure 4:
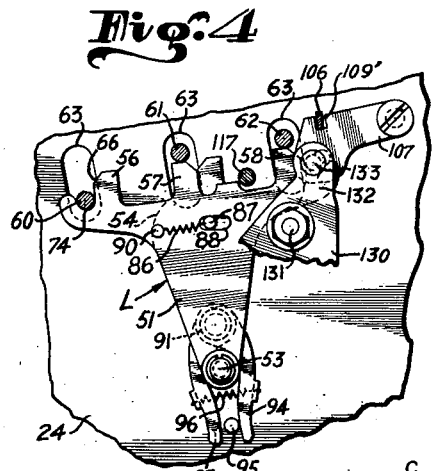
Figure 4 is a view generally similar to Figure 3 and shows only certain principal parts of the locking means illustrated therein.
Figure 6:
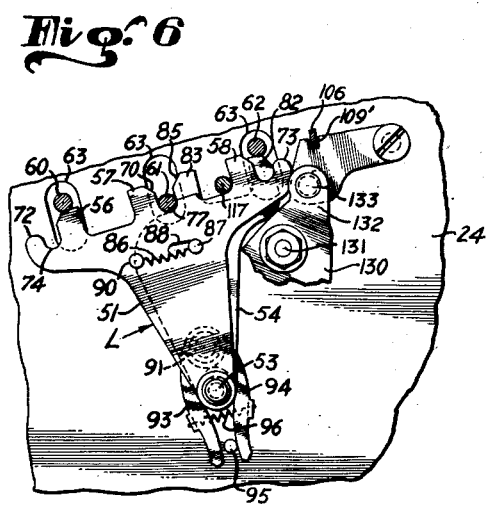
Figure 6 is a view generally similar to Figure 5 and shows only certain principal parts of the locking means illustrated therein.
Figure 8:
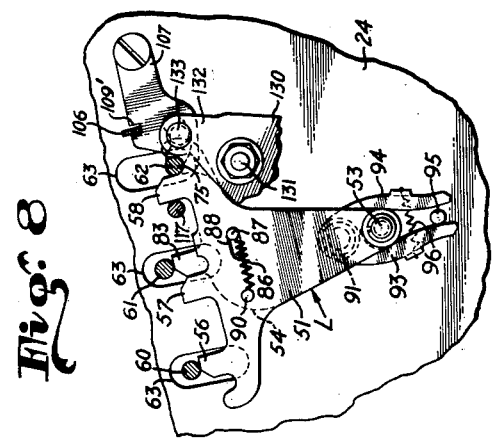
Figure 8 is a view generally similar to Figure 7 and shows only certain principal parts of the locking means illustrated therein.
Figure 13:
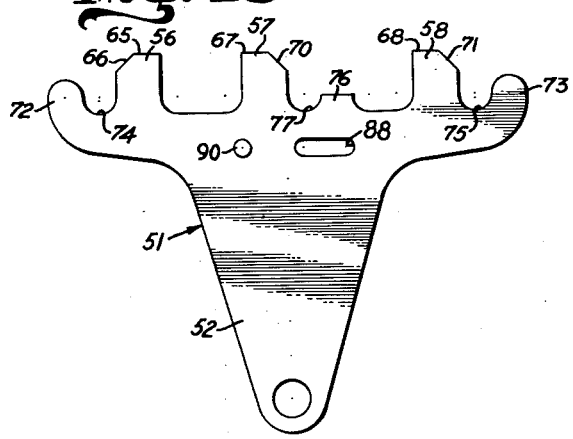
Figures 13 and 14 are enlarged elevational views of locking finger plate elements of a key locking unit shown in Figures 2, 4, 6 and 8.
Figure 14:
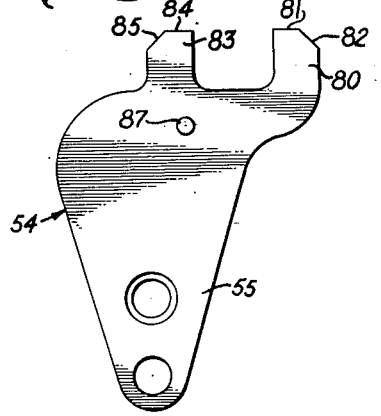
Figure 15:
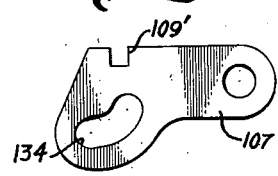
Figure 15 is an enlarged side view of a locking member shown in Figure 1 positioned relative to other cooperative parts of the computing machine.

In accordance with that feature of my invention which is to make a small initial amount of depression of any one of the feature control keys effective to lock the remaining such keys instantly against being depressed, I provide a unitary feature key locking mechanism L shown in Figures 4, 6, and 8 as it appears after having performed different locking functions presently to be explained. In Figure 2, this locking mechanism L is shown in a normal or inoperative position. It includes a hand-like member 51 (see Figures 13 and 14) which may have a body or palm portion 52 of an approximately triangular form converging downwardly made of suitable flat sheet metal and pivoted at its lower end on a shoulder stud 53 in the wall 24. The locking mechanism L also includes a companion sheet metal member 54 with a triangular downwardly converging body 55 pivoted at its lower end on the stud 53 so as to be disposed directly against the body 52. The upper end portion of the body 52 of member 51 is widened at each side to provide room for key-blocking finger means comprising three upwardly extending locking fingers or lugs 56, 57, and 58 spaced apart distances corresponding in a way presently to appear to the distances between key stopping shoulder studs 60, 61, and 62 strongly and rigidly fastened in the ends of levers 17, 18, and 19, respectively, at right angles thereto. The stop studs 60, 61, and 62 are preferably but not necessarily disposed approximately below the centers of feature control keys designated T, ST, and —, respectively, and extend toward the center of the machine to terminate a short distance beyond the side wall 24 for a purpose explained hereinafter. Elongated oversize holes 63 are so made in the wall 24 that the stop pins may pass through the wall and be operatively moved up and down without engaging against any edge portion of the wall around the holes.

The finger 56 has an upper end locking edge 65 at substantially right angles to the long axis of the pin and a declining cam edge 66 on the left side (as viewed in Figure 13) of the finger adjacent the upper end. The fingers 57 and 58 have upper end locking edges 67 and 69 respectively, similar to the edge 65. Also the fingers 57 and 58 have cam edges 70 and 71, respectively, similar to cam edge 66 but positioned on the right sides of these fingers (as viewed in Figure 13). At the left of the finger 56 and at the right of finger 58 are provided short, stub fingers 72 and 73, respectively, and semi-circular valleys 74 and 75 are provided between the fingers 56 and 72 and between the fingers 58 and 73, respectively, and these valleys have slightly larger diameters than the pins 60 and 62 which are seated in these valleys when fully depressed. A stub finger 76 is provided at the right of the finger 57. A semi-circular valley 77 is formed between the fingers 57 and 76 for having seated therein the pin 61 of slightly smaller diameter. The upper end of the body 55 has a rightward extension to which is integrally joined a locking finger or lug 80 which has a locking edge 81 and a declining cam edge 82 of the same form and size as the locking edge 67 and cam edge 70, respectively. The body 55 also has a locking finger 83 with an upper locking edge 84 and a declining cam edge 85 at the left of the finger 83 which joins the edge 84. The finger 83 is normally disposed adjacent the finger 57 (Figure 2).

For securing a cooperative feature control key locking action of the fingers on the member 51 with those on the member 54 in a way presently to appear a pull spring 86 has one end fastened to the end of a pin 87 in the body 55 which pin extends outwardly through an elongated oversized hole 88 in the body 52. The other end of the spring 86 is fastened to a pin 90 fastened in the body 52. The long axis of the hole 88 is approximately at a right angle to the long axis of the body 52.

For holding the unitary locking mechanism L in proper normal initial work position shown in Figure 2 relative to the pins 60, 61, and 62, the following described means may be provided. A stud 91 is secured to the body 55 at a point on the lengthwise axis of the same a short distance from the stud 53. The head of the stud 91 is finished smooth and flush with the face of the body 55. Two depending fingers 93 and 94 may be pivotally mounted on the stud 91 against the inner face of the body 55 and held against displacement therefrom by any suitable well known means.

The fingers 93 and 94 may each have a concave edge formation on its inner side which may engage the adjacent side of the stud 53 in normal position (Figure 2) as will presently appear. A pin 95 for cooperation with the fingers 93 and 94 is fastened in the wall 24 below the stud 53 centered on an imaginary plane passing through the axis of the stud 53 and the stud 91 when the locking mechanism L is in its normal or starting position as illustrated in Figure 2. A pull spring 96 has one end fastened to an integral lug on the finger 93 and the other end to a like lug on the finger 94, this spring being positioned below the lower ends of the bodies 52 and 55.

The three fingers 56, 57, and 58 on the plate 51 provide a complement of blocking components 65, 67, and 68 respectively associated with the blocking parts 60, 61, and 62 on the key stems 14, 15, and 16. Similarly, the fingers 80 and 83 on the plate 54 provide a complement of blocking components 81 and 84 respectively associated with the blocking parts 61 and 62 on the key stems 15 and 16.

Second feature control locking means

Figure 9:
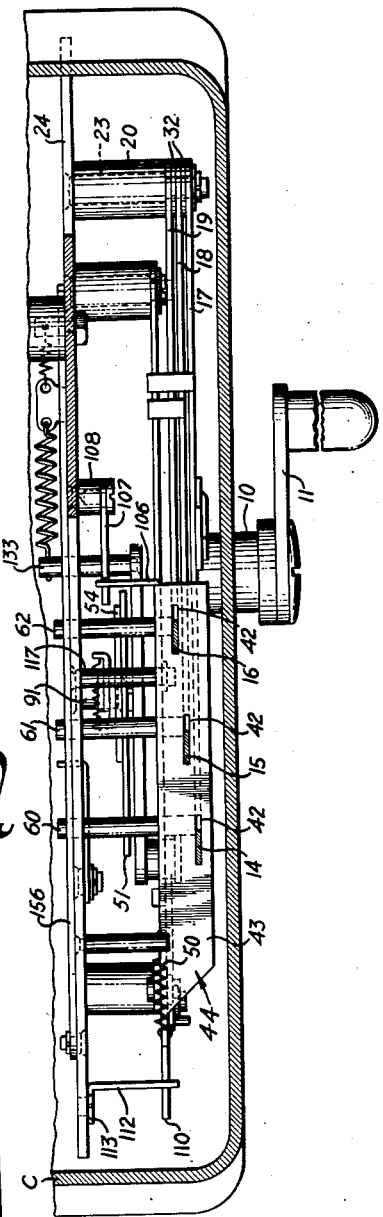
Figure 9 is a partial sectional view of the structure of Figure 1 taken along the line 9—9, as indicated.

To secure that object of my invention which is to provide a second locking means for the feature control keys, the slidable latch plate 44 mounted as is described hereinafter has a body element 101 disposed in a vertical plane between the wall 24 and the adjacent wall element of the cover C. The bent out integral flange element 43 is disposed at approximately right angles to the body 101 and to the stems of the feature keys T, ST and —. The lengthwise locking slots 42 are positioned in the flange 43 as shown in Figure 9, and each key stem 14—15—16 extends upwardly from its associated lever 17, 18 or 19 through its associated slot 42 to have the lower portion of the cam formation on each key stem disposed in its associated locking slot when the associated lever is stopped against the flange 43. The pull spring 50 is effective normally to keep the metal at the forward end of each slot 42 against its associated key stem. As pointed out above, while any feature control key is being depressed its cam formation 41 moves the plate 44 and body 101 forwardly until the shoulder element 40 is below the flange 43 whereupon the flange element at the end of the slot associated with the depressed feature key is moved by the spring 50 over the shoulder to hold the key in its down position. For locking the flange 43 in operative engagement with the stem of the depressed key and over its shoulder 40 a transversely bent integral lug 106 is provided on the rear end of the flange (see Figure 9). A short lever member 107 pivotaly mounted on a shoulder stud 108 in the wall 24 has a notch 109' positioned to receive the lug 106 when the lever is swung up to locking position by means presently to be described.

Figure 11:
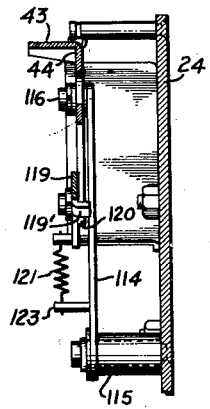
Figure 11 is a partial sectional view taken along the line 11—11 of Figure 1, as indicated.
Figure 12:
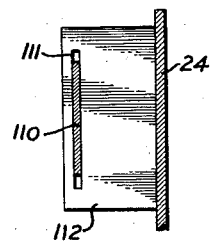
Figure 12 is a partial sectional view taken along the line 12—12 of Figure 1, as indicated.

To provide a slidable mounting for the member 44 that has but little friction and other advantages soon to appear (Figures 1, 11 and 12) the body 101 has a forwardly projecting plate element 110 disposed in a slot 111, the length of which is materially more than the width of the plate element 110, this slot being provided in a flange element 112 of a sheet metal member 113 fastened to the wall 24. To maintain the plate 110 in a floating relation to the ends of the slot 111 and spaced therefrom, the lower end of an upright lever 114 may be pivotally mounted on a sleeve carried by a stud 115 in the plate 24 and the upper end of the lever is pivotally fastened to a shoulder stud 116 mounted in the body 101. The rear end of the body 101 may be slidably mounted on a shoulder stud 117 (Figure 1) fastened in the wall 24 which stud, if desired, may carry antifriction means (not shown) of well known construction and project through a slot 118 in the body 101 with a running fit.

For moving the locking plate 44 forwardly to disengage it from the shoulder of a depressed control key and the stems of undepressed control keys, a trigger member 119 (Figures 1 and 11) may be pivotally mounted on a shoulder stud fastened in the body 101 and have a transversely bent integral lug 119' engaging under the lower edge of a lug 120 on the body 101. To hold the trigger yielding in normal position, a pull spring 121 has one end fastened to an ear 122 on the trigger and the other end fastened to an ear 123 on the lever 114. The rear end of the trigger 119 has a cam edge 124 for engagement with a part presently to be described. Holes 125 are provided in the body 101 to permit the studs 60, 61, and 62 to pass through the body and have adequate clearance for their operative movements and to permit full operative movement of the locking flange 43 without interference from these studs.

To accomplish that object of my invention which is to lock the unoperated feature control keys against depression by a second locking means after only a small initial operating movement of the computing machine under control of a depressed control key has taken place, the following described mechanism may be employed. The rock shaft 10 may have mounted thereon an oscillatable member 126 having a shoulder stud 127 mounted in its outer end. A cam roller (not shown) may be mounted on the stud 127 for engagement in a cam slot 128 in a rocker arm 130 pivotally mounted on a shoulder stud 131 in the wall 24. The arm 130 has a short upwardly inclined extension 132 on the end of which is mounted a stud 133. The pivoted arm 107 has a cam slot 134 acted on by the stud 133 for raising the arm 107. The arm 107 also has a locking notch 109' for receiving the lug 106 and holding the latch plate 44 in one position, as explained hereinafter.

The lower end of the rocker arm 130 has gear teeth for engaging with a gear sector 135 on a main operating shaft 136 of the computing machine. The lower slotted and toothed portion of the rocker arm 130, the gear 135 and shaft 136 may be of substantially the same construction and arrangement as disclosed for like parts in my above noted copending application Serial No. 566,595.

The rocker arm 130 has an upwardly and forwardly inclined integral arm 137 which carries at its upper end a cam roller 138 on a shoulder stud in the arm 137. The cam roller 138 is positioned for engaging the cam edge 124 on the end of the trigger 119 upon movement of the roller as the rocker arm 130 makes a clockwise return movement by operation of the handle 11 or other means. The roller 138 moves the trigger 119 idly out of the way on its counter-clockwise movement. It will be noted that the cam roller 138 does not move the trigger 119 and locking flange 43 until after the locking notched lever 107 has been disengaged from the lug 106. It is to be understood that the shaft 10 may be connected in a suitable well known way with an electric motor (not shown) controllable in a well known way by any of the control keys for driving my computing machine.

*Operation of feature control key locking means*

In Figure 2 the studs 60, 61, and 62 and unitary locking mechanism L are shown in normal or inoperative positions. Should the totalizer key T be depressed (Figures 3 and 4) its stud 60 engages the cam edge 66 and swings the entire member 51 rightwardly i. e., rearwardly enough to bring the locking lug edges 67 and 68 directly under and in very close proximity to the studs 61 and 62 of the keys ST and —.

This locking movement of the member 51 is accomplished during the first part of the depression or operative movement of the key T. The member 54 is moved clockwise too by action of the spring 86 pulling the pin 87 up against the left end of the slot 88. The finger 93 is bodily moved slightly clockwise about the stud 53 and away from the pin 95 against the pull of the spring 96 which also functions to swing the body 54 counter-clockwise when the key T is raised again. The springs 86 and 96 thus cooperate in tending to return the locking mechanism L to normal position (Figure 2).

As the key T is depressed the flange 43 and lug 106 of the latch plate 44 are cammed forward, and then returned to Figure 2 position by the spring 50. As the pull crank 11 and shaft 10 begin to move counter-clockwise the stud 133 acting in cam slot 134 raises the arm 107 and disposes the notch 109' in locking engagement with the lug 106 and holds it there until the end of the return movement of the shaft 10 has been largely completed.

When the return movement of the shaft 10 and the slotted rockable member 130 have been completed enough to disengage the notch 109' from the lug 106, the cam roller 138 will begin to engage the cam edge 124 on the trigger 119 and thus move the flange 43 out of locking engagement with the shoulder of key T which instantly rises to starting position. Thereupon the locking mechanism L returns to normal (Figure 2) position.

When the key ST is depressed (Figures 5 and 6), the lug 61 engages both cam edges 70 and 85 and moves the fingers 57 and 83 apart which swings the finger edge 65 under stud 60 and the finger edge 81 under the stud 62 of the key —. The operation and release of the parts of the second locking means are the same as described above in connection with the locking of the key T.

When the feature control key — is depressed (Figures 7 and 8), its stud 62 will engage the cam edges 71 and 82 and swing the members 51 and 54 counter-clockwise and move the finger 56 under the stud 60 of the key T and bring the finger 83 under the stud 61 of the key ST. The operation and release of the parts of the second locking means are the same as described above in connection with the locking of the key T except as follows. The finger 94 is moved counter-clockwise away from the pin 95 and the finger 93 is held against the pin 95 by the spring 96 which is under a tensile strain. This will swing the member 54 clockwise to Figure 2 position when the key — is raised. The spring 86 then is effective to pull the member 51 clockwise to normal (Figure 2) position.

It will appear from inspection of Figure 9 and consideration of the above description that a depressive force on the unoperated and locked control keys will ordinarily be resisted first by the second locking means and very shortly thereafter by the first locking means. This will occur because the studs 60, 61 and 62, in practice, may not be actually touching the associated locking fingers in locked condition. The locking flange 43 however is ordinarily spring urged into engagement with the key stems associated with the studs 60, 61 and 62.

It can be seen by inspection of Figures 1 and 2 that should a depressive force be exerted on the control keys T and ST at the same instant the studs 60 and 61 will engage oppositely sloped cam edges 66 and 70 on one piece of metal and the member 51 will not be moved in either direction and will prevent the operative movement of key T and/or key ST.

In like manner simultaneous depressive forces on the control keys T and — will be resisted by oppositely sloped cam edges 66 and 71 and fail to move the member 51 and thus cannot be operated. Should simultaneous depressive forces be applied to control keys ST and —, the studs 61 and 62 will engage the oppositely sloped cam edges 82 and 85 and fail to swing the member 54 and its fingers out of their work paths which will thus prevent their operative depression together. It can be further seen that attempted operation of two control keys at one time will not permit either to be depressed enough to be latched in its down or operative position or to be depressed more than a negligible amount.

Figure 10:
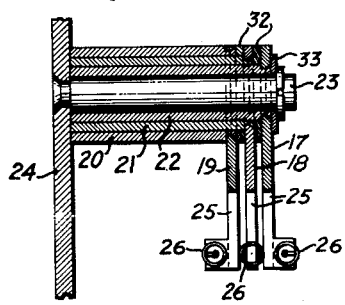
Figure 10 is a partial enlarged sectional view taken along the line 10—10 of Figure 1, as indicated.

In Figures 16, 17, 18, 19, and 20 are illustrated structures which show how I may accomplish that object of my invention which is to provide means which can lock all of the unoperated keys of a large number of feature control keys against operation upon small initial operative movement of any one of the number. In these views, there are shown a totalizer key T, a sub-total key ST, a subtraction key —, and a non-add key which may bear the indicia NA. The construction of the keys T, ST, and —, together with their associated stem members 14, 15, and 16 and offset shoulder elements 40 and cam formations 41 may be the same as described hereinbefore. The key NA may have a stem 16' and a shoulder element 40' and a cam formation 41' thereon substantially as shown in Figure 16 for cooperation with parts hereinafter described. The stem 14 is integrally joined to a lever 17 of the construction described hereinbefore. The stems 15 and 16 may be integrally joined to rearwardly extending levers 18 and 19 of the shape shown in Figures 16 and 21 or of the shape substantially as is shown in Figure 1. In the Figure 16 structure, the levers 18 and 19 are shaped to be positioned with relation to other parts of the computing machine not shown in Figure 16. The stem 16' may be integrally mounted on a lever 150. The levers 17, 18 and 19 may be pivotally mounted on telescoping sleeve members carried by the stud 23 as is described hereinbefore. The lever 150 may be mounted on a sleeve 151 which telescopes over the sleeve 20. Return springs 26 for the levers 17, 18 and 19 may be of the same construction as disclosed hereinbefore but to permit an additional return spring 26' for the lever 150 to be fastened to the stud 28 and to an arm 25' of the lever 150, the depending arms 25 may be arranged slightly differently from the way shown in Figure 10, this different arrangement being shown in Figure 23. Lock engaging studs 60, 61 and 62 may be mounted in the levers 17, 18 and 19 substantially as is described hereinbefore, and a like lock engaging stud 152, except that it is shorter than the studs 60, 61 and 62, may be mounted in the lever 150 under the key NA.

Locking means for coaction with the studs 60, 61, 62 and 152 regardless of their number, which will prevent all of the unoperated control keys being depressed after one of such keys has been initially depressed a small amount may be constructed as follows according to my invention. A key lock set generally designated as 155 is provided for cooperation with the locking stud associated with each control key and includes upright sheet metal key-blocking finger means comprising members 156 and 157 (see Figures 22, 24, 25, 27, and 30). Since these sets may be of the same construction except as appears hereinafter and have the same or similar functions, only one set needs to be described for an understanding of this feature of my invention. A lower portion of the finger member 156 may be slightly inclined to the right and have a mounting hole 158 and another hole 160. Above the hole 160, the finger 156 is shown with a considerably enlarged, i. e., widened out portion 162 with much of the same cut away to leave a relatively large hole 163 through the finger which will permit full operative laterally reciprocable movement of the finger when other parts of the computing machine (not shown) are disposed in the hole 163. It will be understood as the description proceeds that in using my locking means in some machines, the enlarged finger portion 162 and hole 163 may be omitted from some or all of the locking fingers. Above the widened out portion 162 is provided a finger tip portion 165 which may have a straight transversely disposed stud engaging edge 166 and a downwardly and leftwardly inclined cam edge 167.

The finger member 157 (Figure 25) may have a form similar to that of the finger 156 with which it has a cooperative paired relation. It will be noted, however, that these fingers 156 and 157 are not exact duplicates, although the finger 157 may have elements such as a mounting hole 168, a hole 170, a widened portion 172, a hole therein 173, a finger tip portion 175, a transverse locking edge 176 and a cam edge 177 which function similarly to corresponding elements of the finger 156. The design of the fingers 156 and 157 is advantageous in that one set of die tools can be employed for stamping out both fingers of a set from sheet metal each finger to have finger tip elements 165 and 175, one of which will be sheared off. As will presently appear, in some of the sets 155 of locking fingers two finger tip elements with their cam edges in the same plane normally will be needed. In other sets one of the finger tips of each of such sets will be oppositely disposed from the other finger tip as regards their inclined cam edge elements.

One of the sets 155 is mounted under each of the studs in the feature control key levers. Both of the fingers 156 and 157 of each set are pivotally mounted for easy oscillatory movement on a shoulder stud 180 firmly secured to a mounting plate 181 which may be fastened on the wall 24 by screws 182. All of the outwardly disposed fingers of the several sets are interconnected one with the others, by a link member 183 and a short shoulder stud 184 for each finger, which stud has a head element 185 which is seated with a snug working fit in the associated hole 160 in the finger. The head of each stud 184 is disposed slightly inward from the adjacent face of the associated finger so that it cannot interfere with the movement of the other finger of the set. All of the inwardly disposed fingers of the several sets are interconnected, one with the others, by a link member 187, and studs 188 of like construction to that described above for the link member 183 and the studs 184. The fingers 156 and 157 may be fastened on the studs 180 and to the links 183 and 187 and disposed in spaced relationship to the plate 181 by suitable devices of well known construction, as is illustrated in Figure 30, and a further description of these devices appears unnecessary.

In accordance with that feature of my invention which is to provide unitary means for returning all of the locking fingers to normal inoperative positions after each depression of a control key, the following described structure may be employed. A rearward integral extension of the link 183 is fastened loosely by a headed pin 190 to a normalizing mechanism 191. This may include a depending arm 192, and a depending arm 193, each pivotally fastened on the pin 190, and each arranged with a concave side edge element which bears against a stud 194 mounted in the plate 181. Adjacent the lower end of each arm 192 and 193 are bent out integral lugs 195, which are connected by a pull spring 196. When the mechanism 191 and the sets 155 of the locking fingers 156 and 157 are in normal position, the inner edges of the arms 192 and 193 adjacent their lower ends will each bear against a pin 197 secured in the plate 181 in alignment with the pin 190 and stud 194. It will be noted that the inwardly disposed fingers of the sets 155 are not connected with the normalizing mechanism 191, and to return these inwardly disposed fingers to their normal, inoperative positions, a forward integral extension of the link 187 is loosely fastened by a pin 200 to a normalizing mechanism 201 the parts of which may be duplicates of the corresponding parts of the mechanism 191. However, the mechanism 201 is turned upwardly instead of downwardly to avoid interference with parts of the computing machine (not shown). The mechanisms 191 and 201 as is shown in Figures 17, 18, 19, and 20 function in a similar manner to the functioning of the normalizing mechanism employed in connection with the locking device L described hereinbefore, except as appears hereinafter. It will be noted that all of the sets of locking fingers and the two normalizing mechanisms including the cooperating studs 194 and pins 197 and mounting plate 181 constitute a sub-assembly or unit (see Figures 27 and 30) easily attached to the wall 24 or removed therefrom.

When four feature control keys are employed according to my present invention, the stems of the keys T, ST, and — may extend upwardly through the slots 42 provided in a modified flange 43. For locking the key NA by action of the flange 43, instead of extending the flange considerably to the rear to provide room for another slot 42, a deep, narrow locking notch 202 may be provided in the rear end of the flange 43 and a larger cam formation 41' than the cam formations 41 is provided on the forward end of the lever 150 for engaging against the metal at the forward edge of the notch 202. The other parts of the feature key locking means associated with the flange 43 may be of the same construction and arrangement as is described hereinbefore in connection with the flange 43, except that a pivoted locking lever arm 204 is longer than the similarly functioning lever 107 and a stud 205 for mounting the lever 204 is shorter than the stud 108 for the lever 107.

The four fingers 156 constitute a complement of blocking components, including components 166—166 respectively associated with the blocking parts 60 and 152 on the key stems 14 and 16', and components 176—176 respectively associated with the blocking parts 61 and 62 on the key stems 15 and 16. Similarly the four fingers 157 constitute a complement of blocking components, including components 166—166 respectively associated with the blocking parts 60 and 61 of the key stems 14 and 15, and components 176—176 respectively associated with the blocking parts 62 and 152 on the key stems 16—16'.

*Functioning of multiple sets of interconnected locking fingers*

In Figure 16, the normal inoperative or starting position of the sets 155 of key locking fingers 156 and 157 is shown. It will be noted that in the sets associated with the T and — control keys, the inclined cam edges 167 and 177 are disposed in the same plane. Also it will be noted that in the alternate sets of locking fingers associated in the present application with the control keys ST and NA, the inclined cam edges 167 and 177 are disposed in planes which intersect each other at a relatively small angle. The mechanisms 191 and 201 which have a double function of retaining each of the sets 155 in normal, inoperative positions and of restoring all of the sets to normal position after any control key has been depressed and returned to its normal upper position, are disposed in starting positions so that the pin 198 is in alignment with the fixed studs 194 and 197. The mechanisms 191 are effective to require approximately an equal amount of depressive force to move operatively any of the locking finger sets 155, irrespective of the number of such sets interconnected with each other and the equalizing mechanisms 191. It can be seen from inspection of Figures 16, 17, and 19 that depression of either the first (T) or third (—) control key makes the associated locking stud engage both cam edges 167 and 177 at the same instant and swing their associated fingers and the interconnecting links 183 and 187 in the same direction. Also, it will be seen from inspection of Figures 16, 18, and 20 that depression of either the second (ST) or fourth (NA) keys makes the associated stud engage both cam edges 167 and 177 at the same time and swing their associated fingers and the interconnecting links 183 and 187 in opposite directions.

Upon a small initial depressive movement of control key T (see Figures 16 and 17) a locking edge 176 is swung under the lock studs 61 and 152 of the keys ST and NA, respectively, and two locking edges 176 are swung under the stud 62 of the key — and these keys cannot be depressed until the computing machine has completed an operation under control of the key T. Upon a small initial depressive movement of the control key ST (see Figures 16 and 18) a locking edge 166 is swung under the stud 60; a locking edge 176 is swung under the stud 62, and locking edges 166 and 176 are swung under the stud 152, and their associated control keys cannot be operated. Upon a small initial depressive movement of the key — (see Figures 16 and 19) two locking edges 166 are swung under the stud 60, and one locking edge 166 is swung under each stud 61 and NA and their associated control keys cannot be operated. Upon a small initial depressive movement of the key NA (see Figures 16 and 20) one locking edge 166 is swung under the stud 60, locking edges 166 and 176 are swung under the stud 61, and one locking edge 176 is swung under the stud 62, and their associated control keys cannot be operated.

By inspection of Figure 16, it can be seen that should an attempt be made accidentally or otherwise to depress the control keys T and ST for example, at the same instant, the stud 60 will engage the outer inclined cam edge 167 thereunder and the stud 61 will engage the oppositely inclined cam edge 177 thereunder. Since these edges are on locking fingers connected by a portion of the unyielding inner link member 187 they cannot move out of the way of the studs and thus prevent the depression of either of these studs or the control keys connected therewith. In like manner, attempted simultaneous depression of the keys T and — will be prevented by the associated studs 60 and 62 engaging against oppositely inclined cam edges 167 and 177 of the associated fingers which are connected by an unyielding portion of the outer link 183. The attempted simultaneous depression of the keys T and NA will be prevented by engagement of the associated studs 60 and 152 with oppositely inclined cam edges 167 and 177 on fingers connected by a portion of the inner link 187. Attempted simultaneous depression of the keys ST and — will be prevented by engagement of the associated studs 61 and 62 with oppositely inclined cam edges 167 and 177 on fingers connected by a portion of the inner link 187. Attempted simultaneous depression of the keys ST and NA will be prevented by the associated studs 61 and 152 engaging oppositely inclined cam edges 167 and 177 of fingers connected by a portion of the link 183 and a portion of the link 187. Attempted simultaneous depression of the keys — and NA will be prevented by the engagement of the studs 62 and 152 engaging against oppositely inclined cam edges 167 and 177 on fingers conencted by a portion of the link member 183. It can be seen that a small extent of depressive movement of two control keys may take place when a depressive force is applied simultaneously to the two keys but this movement will be so small as to be negligible. Since no two control keys can be simultaneously depressed on a computing or other machine equipped with my locking means described hereinbefore, it can be readily seen that simultaneous depression of three or more control keys will also be prevented according to my invention.

From a consideration of the disclosure hereinbefore, it can be seen that the arrangement of the sets of locking fingers interconnected by unyielding links with equalizing devices can be extended for making use of any number of locking fingers likely to be needed in connection with the operation or control of any key operable or key controllable machine. It can also be seen that the number of such locking fingers interconnected by a single link can be increased and/or the number of interconnecting links arranged side by side can be increased. Also, it will be understood that one element of the interconnection of two different locking fingers is found in the locking studs in the control key lever involved. It can be readily seen, however, that in some cases the locking studs may be omitted and the key stems or levers can be so formed as to be operatively engaged by the locking fingers upon depression of the associated keys.

The feature control keys T, ST, —, and NA may be operatively connected with associated parts of the accumulator mechanism of my computing machine through depending links 250, 251, and 252 having lost motion connections with the key levers in the form of short lengthwise slots 254 in the links through which flanged studs fastened in the levers may project. The construction and operation of the connecting levers 250, 251, and 252 are described with more particularity and claimed in my copending application, Serial No. 650,010, filed February 25, 1946.

The feature control keys T, ST, and — may be operatively connected with a printing device 255 through means of the studs 60, 61, and 62 engaging with a slideable rack member 256. The construction and operation of the printing devices 255 and the operative connections of the feature control keys CK therewith are described with more particularity and claimed in my copending application Serial No. 650,010, filed February 25, 1946.

Certain of the advantages of the present invention will appear from a reading of the foregoing description. Other advantages arise from the employment of the slideable key locking member for arresting the upward movement of the keys when they are released to be moved upwardly by their return springs.

Other advantages arise from the provision of lengthwise slots in the links which connect the levers of the feature control keys with parts of the accumulating mechanism of the computing machine. This construction helps to assure that the undepressed keys will be locked against accidental depression before mechanism under control of a selected feature control key will be affected by depression of such key, especially in motor driven computing machines embodying my invention.

Still other advantages arise from the provision of a key locking mechanism operable by depression of a selected feature control key for locking a plurality of undepressed keys, which mechanism is of a design that can be constructed to take care of additional depressible keys where more than three are employed.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices and systems.

Having described my invention, what I claim as new and desire to secure by Letters Patent is:

1. In a computing machine, the combination of a plurality of depressible feature control keys, upwardly urged levers associated with said keys, one of said keys being mounted on an end of an associated lever, a locking stud for each of said keys in each of said levers transversely disposed thereto under its associated key, and key operable means for locking any of the remaining unoperated control keys against depression upon the depression of a selected control key, said key operable means including a fixed pivot member in said machine lower than said lever carried studs, a first upright plate member pivotally mounted on said fixed member, a second upright plate member pivotally mounted on said fixed member contiguous to said first plate member, a plurality of upreaching finger-like members on said first plate member, each of said finger members having a downwardly sloping cam edge disposed under and closely to one of said lever carried studs, each of said finger members having a locking edge movable under the associated lever carried stud, said second plate member having a plurality of upreaching finger members each having a sloping cam edge and a locking edge of similar construction to the cam edges and locking edges of said first plate member, at least one of the cam edges of said second plate member being sloped downwardly in the opposite direction to the cam edge of an adjacent finger on said first plate whereby a superposed associated lever carried stud when depressed will move one plate in one direction and the other plate in the opposite direction for the key locking purposes set forth, spring operated means carried jointly by said first and second plate members which tend to return said plate members toward each other and to normal starting positions on said pivot member after any depressed lever carried stud is raised clear of said key operable locking means, the construction and arrangement of the cam edges and locking edges on the fingers of both plates being effective upon the depression of any selected key to cam the locking edge of at least one finger of one of the two plate members under each undepressed lever carried stud.

2. In a computing machine, the combination of three depressible keys each having a blocking part; and locking means for preventing depression of any undepressed key when any other of said keys is in depressed position, comprising a first plate having three blocking components and three cam surfaces respectively contiguous thereto, means mounting said first plate in a normal position in which two of said blocking components are disposed respectively at the correspondingly same sides of the lines of movement of the blocking parts of two of said keys and in which the other of said blocking components is disposed at the correspondingly opposite side of the line of movement of the blocking part of the other of said keys with said cam surfaces being disposed in the lines of movement of the respectively associated blocking parts, the cam surfaces contiguous to said two blocking components both being so inclined that upon either being engaged by the blocking part of the associated key said first plate will be moved in a first direction to set said other of said blocking components in blocking position in the line of movement of the associated key blocking part, the cam surface contiguous to said other blocking component being inclined oppositely to said two cam surfaces so that upon being engaged by the blocking part of the associated key said first plate will be moved in a second and opposite direction to set said two of said blocking components in blocking position in the line of movement of the respectively associated key blocking parts, a second plate having two blocking components and two cam surfaces respectively contiguous thereto, means mounting said second plate in a normal position in which its blocking components are disposed respectively adjacent but on correspondingly opposite sides of the lines of movement of said two keys, the cam surfaces associated with the blocking components on said second plate being mutually oppositely inclined and normally being disposed respectively in the lines of movement of said two keys, whereby said second plate will be moved in one direction or the other depending upon which of said two keys is depressed, and resilient means connecting said plates so that movement of one of said plates in one direction will move the other of said plates in the same direction.

3. In a computing machine, the combination of a plurality of depressible feature control keys; locking means for said keys including a set of at least two uprightly disposed pivoted fingers under each of said keys; means interconnecting all of said sets of fingers for holding each of them in a normal, inoperative starting position, said interconnecting means including a first link loosely connected to one finger of each of said sets, a second link loosely connected to the remaining finger of each of said sets, and a spring powered equalizing device connected with each of said links effective to maintain each of said pivotally mounted sets in normal, upright, starting position with an approximately equal resistance to displacement therefrom; and mounting means for said sets of fingers and said holding means whereby all of the elements of said locking means can be mounted as a single unit on said machine irrespective of the number of the sets of pivoted fingers employed.

MAX GARBELL.

REFERENCES CITED

The following references are of record in the file of this patent:

UNITED STATES PATENTS

| Number | Name | Date |
|---|---|---|
| 1,655,570 | Shipley | Jan. 10, 1928 |
| 1,669,996 | Naumann | May 15, 1928 |
| 1,791,905 | Robertson | Feb. 10, 1931 |
| 1,978,914 | Robertson | Oct. 30, 1934 |
| 2,079,704 | Finfrock et al. | May 11, 1937 |
| 2,091,778 | Garbell | Aug. 31, 1937 |
| 2,107,445 | Klarr et al. | Feb. 8, 1938 |
| 2,352,376 | Friden | June 27, 1944 |
| 2,382,661 | Pott | Aug. 14, 1945 |